US006213571B1

(12) United States Patent
Yamada et al.

(10) Patent No.: US 6,213,571 B1
(45) Date of Patent: Apr. 10, 2001

(54) CONTROL APPARATUS FOR AN ELECTRIC VEHICLE AND A METHOD THEREFOR

(75) Inventors: Hiroyuki Yamada; Nobuyoshi Takahashi; Kenichi Maehara; Minoru Kaminaga, all of Hitachinaka (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/428,518

(22) Filed: Oct. 28, 1999

(30) Foreign Application Priority Data

Oct. 28, 1998 (JP) .................................................. 10-307555

(51) Int. Cl.[7] ................................ H02P 3/10; B60L 7/00; B60L 7/12
(52) U.S. Cl. ............................ 303/152; 188/158; 303/20; 318/371; 318/376
(58) Field of Search ................................. 303/152, 20, 3; 188/158–165; 318/376, 371, 375, 370, 373, 258; 180/65.1, 65.8, 165; 701/20

(56) References Cited

U.S. PATENT DOCUMENTS

| | | |
|---|---|---|
| 4,124,812 | 11/1978 | Naito et al. . |
| 4,388,573 * | 6/1983 | Horiuchi et al. ...................... 318/376 |
| 4,423,363 * | 12/1983 | Clark et al. .......................... 318/376 |
| 4,427,928 * | 1/1984 | Kuriyama et al. ................... 318/376 |
| 4,479,080 * | 10/1984 | Lambert .............................. 318/376 |
| 4,712,054 * | 12/1987 | Boldt . |
| 4,730,151 * | 3/1988 | Florey et al. ........................ 318/376 |
| 5,136,219 * | 8/1992 | Takahashi et al. . |
| 5,332,954 * | 7/1994 | Lankih . |
| 5,511,866 * | 4/1996 | Terada et al. ........................ 303/152 |
| 5,549,371 * | 8/1996 | Konaga et al. ...................... 303/152 |
| 5,861,724 * | 1/1999 | Ackerson ............................. 318/376 |
| 5,875,281 | 2/1999 | Thexton et al. . |

FOREIGN PATENT DOCUMENTS

| | | |
|---|---|---|
| 3414592 * | 10/1984 | (DE) . |
| 57-6502 * | 1/1982 | (JP) . |
| 1157202 * | 6/1989 | (JP) . |
| 4322104 * | 11/1992 | (JP) . |
| 5-38002 | 2/1993 | (JP) . |
| 7-46707 | 2/1995 | (JP) . |
| 7-163007 | 6/1995 | (JP) . |
| 7-163009 | 6/1995 | (JP) . |
| 11355916 * | 12/1999 | (JP) . |
| 32603 * | 1/2000 | (JP) . |
| 134711 * | 5/2000 | (JP) . |

* cited by examiner

*Primary Examiner*—Douglas C. Butler
(74) *Attorney, Agent, or Firm*—Evenson, McKeown, Edwards & Lenahan, P.L.L.C.

(57) ABSTRACT

Problems of a dead-time due to a make-contact delay time until the closure of the regeneration contactor and a drop of torque occurring in the prior art controller for an electric vehicle are solved by the invention, thereby providing an improved drive feeling during transition from its regenerating braking to plugging braking. Specifically, a regeneration contactor's contact voltage is entered to the arithmetic unit, upon set-up of a condition for stopping the regenerating braking, the control for closing the regeneration contactor is executed, and immediately upon detection of the actual closure thereof, the switching operation is cut off at a timing faster than the switching cycle thereby allowing for the transition to the plugging braking to be enabled.

7 Claims, 6 Drawing Sheets

CONTROL APPARATUS FOR AN ELECTRIC VEHICLE AND A METHOD THEREFOR

BACKGROUND OF THE INVENTION

The present invention relates to a control apparatus for an electric vehicle and a method thereof for controlling a dc motor for driving the electric vehicle, and in particular, it relates to a braking control of the electric vehicle.

It is known in order to shorten a transition period of time when switching from a regenerative braking mode to a plugging braking mode in an electric vehicle that immediately after detection of a make-contact of a regenerative contactor, a chopper operation for reverse braking is started. It is disclosed in JPA No. 7-46707 that when switching from a regenerative braking to a plugging braking by reading a contact voltage of a regenerative contactor, a main transistor is caused to be on for a minimum period of time during a delay time until the regenerative contactor is closed, and a make contact of the regenerative contactor is detected on the basis of a contact voltage of the regenerative contactor, then a shift to the plugging brake mode is enabled.

In the steps of the aforementioned prior art, it is inevitable when shifting from regenerative braking to plugging braking to stop its regenerative braking once before execution of a regenerative contactor make-contact control, after execution thereof and during a delay time until the regenerative contactor is closed, a main transistor is switched on for a minimum period of time, then the make-contact of the regenerative contactor is detected. Therefore, during the delay time of several tens ms until make-contact of the regenerative contactor, because the main transistor is switched on for the minimum period of time, almost no current conduction state (if any, for a very limited period of time) exists in the motor. During this period of time of no current conduction states in the motor, no braking torque is generated thereby allowing the vehicle to cruise. This period of time without generation of braking torque during transition from regenerative braking to plugging braking is felt by the driver as a switching lag time to deteriorate the feeling during switching therebetween.

Further, although description of detection of the contact voltage of the regenerative contactor is given in the prior art, no consideration is given to a case when the contact voltage of the regenerative contactor cannot be detected due to a failure of wiring or the like.

SUMMARY OF THE INVENTION

An object of the invention is to provide a control apparatus for an electric vehicle and a method therefor, which ensures an improved feeling to be obtained during switching from the regenerative braking to plugging braking by controlling such that switching therebetween is executed while maintaining a condition for its braking torque to sustain without a drop.

Another object of the invention is to provide a control apparatus for an electric vehicle and a method therefor, which ensures operation of the control apparatus for electric vehicle to be maintained even if a contact voltage of the regenerative contactor cannot be detected due to failure of its wiring or the like.

Still another object of the invention is to provide a control apparatus for an electric vehicle and a method therefor, which minimizes a rush current at making contact of the regenerative contactor, a shock of switching therebetween and a damage of contacts of the regenerative contactor.

An aspect of the features of the invention is realized by provision of a control apparatus for an electric vehicle which is comprised of: a dc motor; a field switch unit for interchanging connection of the dc motor so as to interchange a direction of excitation of fields; a dc power source for supplying power to the dc motor; a switching unit for controlling power supplied from the dc power source and a current to flow through the dc motor; a regenerative contactor interconnected between the dc power source and an armature of the dc motor; and a control unit for controlling operation of the switching unit and the regenerative contactor such that the dc motor of the control apparatus for electric vehicle is operated in either mode of powering, regenerative braking or plugging braking, wherein when switching the dc motor from the regenerative braking mode to the plugging braking mode, a rake-contact of the regenerative contactor is detected on the basis of a contact voltage of the regenerative contactor which is a voltage detected between the regenerative contactor and the armature of the motor, and upon detection of the make-contact thereof, operation of the switching unit is stopped, then the mode shifts to the plugging braking.

Another aspect of the features of the invention is realized by provision of a control apparatus for electric vehicle, which is comprised of: a dc motor; a field switch unit for interchanging connection of field windings of the dc motor to interchange a direction of excitation of fields; a dc power source for supplying power to the dc motor.; a switching unit having a switching element for switching power supplied from the dc power source and controlling a current to flow through the dc motor; a regenerative contactor interconnected between a plus terminal of the dc power source and an armature of the dc motor; a control unit for controlling operation of the switching unit and the regenerative contactor, said control unit is provided with an arithmetic unit which produces a drive signal for driving the switching unit and also a drive permission signal, here, a logical product of the drive signal and the drive permission signal is taken to output a drive signal to drive the switching unit such that the dc motor is controlled to operate in the powering, regenerative braking and plugging braking modes, wherein a contact voltage of the regenerative contactor which is detected between the regenerative contactor and the armature of the motor is entered to the arithmetic unit, closure of the regenerative contactor is detected on the basis of the contact voltage detected and entered, and when the dc motor is to be switched from the regenerative braking to plugging braking, a make-contact procedure for closing the regenerative contactor is executed while continuing the regenerative braking even in a delay time until the closure of the regenerative contactor, and upon detection of the closure of the regenerative contactor, the operation of the switching unit is stopped faster than a switching cycle of the regenerative braking thereby allowing for a transition to the plugging braking.

Preferably, detection of the contact voltage of the regenerative contactor according to the invention is carried out in a period of time which starts from where a condition is established for stopping the regenerative braking that the current conduction ratio of the switching device under regenerative braking becomes larger than its threshold value and that the current of the motor under regenerative braking becomes lower than its threshold value, and which ends upon detection of the closure of the regenerative contactor. Further, preferably, the detection of the contact voltage of the regenerative contactor according to the invention is carried out in a cycle faster than a switching cycle of the switching device under the regenerative braking, and upon detection of the closure of the regenerative contactor, by operation of the drive permission signal from the arithmetic unit, the switching unit is stopped its operation faster than the switching cycle of the switching device under regenerative braking.

Preferably, according to the invention, switching of the control modes from the regenerative braking to the plugging braking is done in such a manner that delay times for making-contact of the regenerative contactor are pre-stored in memory with a voltage of the dc power source as its parameter, a time from the start of the make-contact control for the regenerative contactor is measured and compared with a delay time for making-contact of the regenerative contactor based on the voltage of the dc power source, and if a contact voltage of the regenerative contactor is not detected within the delay time for making-contact thereof, the control mode is switched from the regenerative braking to the plugging braking when the delay time for making-contact thereof elapses.

Preferably, according to the invention, switching of the control modes from the regenerative braking to the plugging braking is done in such a manner that, for switching of operation based on the measurement of the delay time for making-contact of the regenerative contactor, there are provided a first threshold value of a delay time for making-contact of the regenerative contactor corresponding to the voltage of the dc power source and a second threshold value of a delay time therefor which is obtained by adding a predetermined delay time to the first threshold value, and if a contact voltage of the regenerative contactor is not detected, operation of the switching device for the regenerative braking is stopped when a time of the first threshold value elapses, then switching from the regenerative braking to the plugging braking is executed when a time of the second threshold value elapses.

Still another aspect of the invention is accomplished by provision of a control apparatus for electric vehicle and a method therefor, which is comprised of: a dc motor; a field switch unit for interchanging connection of field windings of the dc motor to interchange a direction of excitation of fields; a dc power source for supplying power to the dc motor; a switching unit for switching the power supplied from the dc power source and controlling a current to flow through the dc motor; a regenerative contactor interconnected between the dc power source and an armature of the dc motor; and a control unit for controlling operation of the switching unit and the regenerative contactor such that the dc motor is operated in the powering, regenerative braking or plugging braking modes, wherein, in the step of switching the dc motor from the regenerative braking to the plugging braking mode, making-contact of the regenerative contactor is detected based on a contact voltage of the regenerative contactor that is a voltage detected between the regenerative contactor and the armature of the motor, then upon detection of the make-contact thereof, operation of the switching unit is stopped to allow for a transition to the plugging braking.

The features and advantages according to the invention reside in that in the step of transition from the regenerative braking to the plugging braking, a smooth transition therebetween without a drop of its braking torque is ensured by elimination of the dead time during transition, and that an improved feeling during transition therebetween, elimination of a shock and damage of the contact of the regenerative contactor are obtained.

BRIEF DESCRIPTION OF THE DRAWINGS

The invention will be more particularly described with reference to the accompanying drawings, in which.

PREFERRED EMBODIMENTS OF THE INVENTION

A control apparatus for electric vehicles of a preferred embodiment according to the invention will be described in the following with reference to the accompanying drawings.

Figure 1:
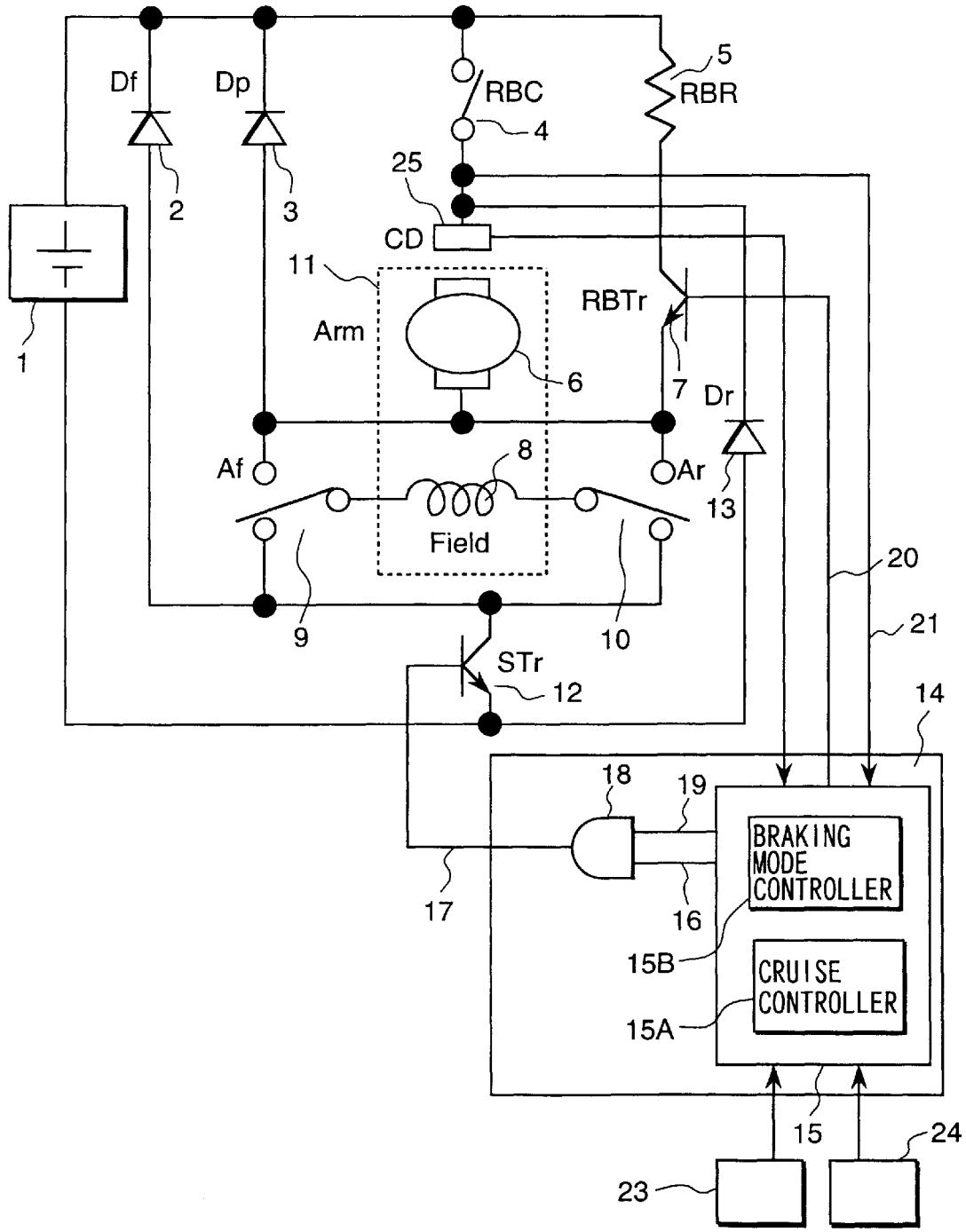
FIG. 1 is a schematic block diagram of a control apparatus for electric vehicle according to one embodiment of the invention.

FIG. 1 shows a fundamental arrangement of a control apparatus for electric vehicles according to one embodiment of the invention. This control apparatus for electric vehicle is comprised of a dc power source 1, and a flywheel diode 2, a plugging diode 3, a regenerative contactor 4 and a regenerative resistance 5 which are connected to a plus side of the dc power source 1, wherein the regenerative contactor 4 is further connected to a motor armature 6 of a motor 11. The plugging diode 3 is connected to motor armature 6 in parallel with regenerative contactor 4. A regenerating semiconductor 7 is connected to regeneration resistance 5, and the regeneration semiconductor 7 is further connected to motor armature 6. A motor field winding 8 is interconnected between a forward contactor 9 and a reverse contactor 10 which are connected to the aforementioned plugging diode 3, motor armature 6 and regeneration semiconductor 7, wherein by alternatively closing forward contactor 9 and reverse contactor 10, a direction of a current to flow through the motor field winding 8 is interchanged to change a direction of excitation of motor field winding 8 so as to control a direction of rotation of the motor 11. A switching semiconductor 12 is interconnected between the minus side of the dc power source 1 and a connection node between the forward contactor 9 and reverse contactor 10, and this switching semiconductor 12 controls a current to flow through the motor 11 by its switching operation. A regeneration diode 13 is connected from the minus side of dc power supply 1 to a node between motor armature 6 and regeneration contactor 4.

These main circuit and its components are controlled by a control unit 14. Arithmetic unit 15 in control unit 14 is provided with a cruise control section 15A of built-in type which has a function to produce a motor drive signal such as for powering, regenerating and the like for the motor under cruising, and a braking mode control section 15B of built-in type which has a function to control braking operation during switch-over from regenerating braking to plugging braking and the like. By way of example, sharing of these functions between the cruise control section 15A and braking mode control section 15B can be modified and determined according to a necessity. Function sharing between the cruise controller 15A and braking mode controller 15B within arithmetic unit 15 in the following description is determined only by convenience and it is not limited thereto. Further detailed distinction of the two in an actual arithmetic processing circuit or in a computer program will not be of much use.

Cruise controller 15A of arithmetic unit 15 generates a semiconductor drive signal 16 for controlling operation of motor 11 in response to signals from acceleration device 23 and forward/backward select unit 24. At the same time, arithmetic unit 15 also generates a drive permission signal 19. Both semiconductor drive signal 16 and drive permission signal 19 are entered to drive gate 18, in which a logical product therebetween is obtained and output as a switching signal 17 to operate switching semiconductor 12 accordingly. Arithmetic unit 15 also produces a regeneration semiconductor drive signal 20 to drive regeneration semiconductor 7. A voltage at a connection node between motor armature 6 and regeneration contactor 4 is arranged to be entered to arithmetic unit 15 as a contact voltage 21 of the regeneration contactor. Forward contactor 9, reverse contactor 10 and regeneration contactor 4 are arranged to excite its excitation coil of each contactor in response to each signal from arithmetic unit 15 to perform its operation so as to open or close each contactor.

Here, while the contact of regeneration contactor 4 is closed, when forward/reverse select unit 24 is operated to select a forward direction and acceleration device 23 is pressed down, arithmetic unit 15 causes the contact of forward contactor 9 to be switched to Af side for closing thereby switching the switching semiconductor 12, conducting a current through the motor 11, and thereby generating a torque in the motor so as to drive the electric vehicle.

During this cruising operation, if the forward/reverse select unit 24 is switched to the reverse, arithmetic unit 15 causes to open the forward contactor 9 and to close reverse contactor 10 by switching the contact thereof to Ar side. This is a so-called switch back operation. At this time, arithmetic unit 15 determines if it is possible for the motor 11 to execute its regenerating braking or not, and if possible, the arithmetic unit causes regeneration contactor 4 to be opened and to turn on regeneration semiconductor 7. By setting regeneration semiconductor 7 on-state, a current flows from dc power supply 1 to armature field winding 8 via regeneration resistance 5 thereby generating an electromotive force in motor armature 6. When this electromotive force of motor armature 6 becomes greater than a predetermined value, a current flows through regeneration diode 13, in a circuit from motor armature 6 reverse contactor 10 switching semiconductor 12 regeneration diode 13. At this time, if switching semiconductor 12 is turned off, the current that is flowing through switching semiconductor 12 is caused to flow through flywheel diode 2 in a circuit from dc power supply 1 regeneration diode 13 motor armature 6 reverse contactor 10 motor field winding 8. This feedback power to dc power supply 1 enables a regenerating braking, thereby allowing for the motor 11 to generate a braking torque to brake the electric vehicle.

When this regenerating braking is applied, the rotation of motor 11 drops, thereby causing its electromotive force to decrease with a drop of the rotation of motor 11. However, arithmetic unit 15 which by sensing a current of motor 11 by means of current detection unit 25 variably controls a conduction ratio, i.e., conduction time, of switching semiconductor 12 in order -to maintain a motor current during regeneration braking as constant as possible in accordance with a change of its current, i.e., its electromotive force of the motor 11 such that a regeneration braking force is sustained.

However, when the rotation of motor 11 drops further, its electromotive force of motor armature 6 decreases further, and even if its conduction ratio is controlled to be greater than a predetermined value, the current of motor 11 is caused inevitably to drop. At this time, therefore, braking mode controller 15B of arithmetic unit 15 determines that the regeneration braking is to be terminated when the current conduction ratio for switching the switching semiconductor 12 becomes greater than a preset value and when the current flowing through motor armature 6 drops below a preset level. Upon determination that the regeneration braking is to be terminated, arithmetic unit 15 executes a make-contact control for closing regeneration contactor 4.

However, there exists a delay time from the make-contact control for closing regeneration contactor 4 until the contact of regeneration contactor 4 is actually closed, namely, the contact thereof does not make contact immediately. During this delay time, arithmetic unit 15 of the invention causes for switching semiconductor 12 to continue its switching operation for the regeneration braking. At this time, a contact voltage 21 of the regeneration contactor 4 detected before the make-contact thereof and entered to arithmetic unit 15 becomes an identical level with the minus potential of dc power supply 1 because the conduction ratio of the switching semiconductor is nearly 100%.

Then, after elapse of the delay time for making-contact of regeneration contactor 4, and the contact thereof is actually closed, a contact voltage 21 of the regeneration contactor 4 becomes equal to the plus potential of dc power supply 1, which is sensed by arithmetic unit 15 to confirm that the contact of the regeneration contactor 4 is actually closed. Then, braking mode controller 15B immediately switches drive permission signal 19 to a low level. By this operation, semiconductor drive signal 16 being input to drive gate 18 is immediately cut off, thereby immediately stopping switching signal 17 for driving switching semiconductor 12. After that, the braking mode controller 15B shifts its operation to the plugging braking mode; to return the current conduction ratio of semiconductor drive signal 16 to zero; to resume a high level for drive permission signal 19, and then, generates a current conduction ratio for the plugging braking and produces a switching signal 17. In response to this switching signal 17, the switching semiconductor 12 is operated, thereby generating a field in motor field winding 8 for driving motor 11 in a reverse direction, and thereby generating a braking force for braking motor 11 in the plugging braking mode.

By provision of the aforementioned arrangement according to the invention, the braking mode controller 15B is allowed to continue its regeneration braking until a period of time immediately before the actual make-contact of regeneration contactor 4, and after the actual make-contact thereof, an immediate shift to the plugging braking is allowed to be executed. Therefore, because a braking torque is ensured to be generated continuously for motor 11 as the current is kept flowing in motor 11 even during the delay time for making-contact of the regeneration contactor 4, there are such advantages that a time lag due to a drop of the braking torque during transition from the regeneration braking to the plugging braking can be minimized, and that a smooth transition from the regeneration braking to the plugging braking without impairing the feeling and comfort of the driver and passenger can be ensured to be maintained.

Figure 2:
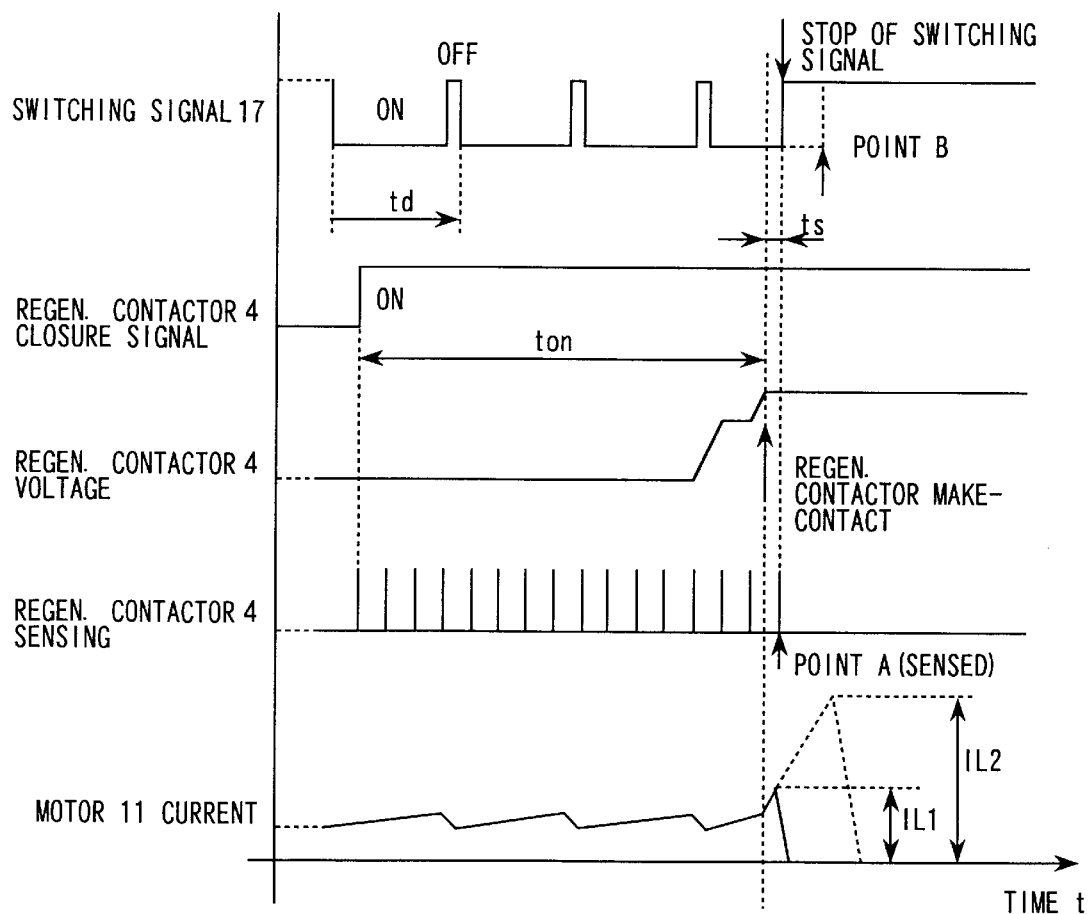
FIG. 2 is a chart of operation at making-contact of a regenerative contactor in the control apparatus for electric vehicle of FIG. 1 in the step of transition from its regenerative braking to plugging braking.

FIG. 2 is a time chart of operation for the control apparatus of FIG. 1 at the time of making-contact of regeneration contactor 4, in particular, when shifting from the end of regeneration braking to the plugging braking. During the regeneration braking, in particular, during a period of time immediately before the termination of the regeneration braking, because that the rotation of motor 11 is low, a current conduction ratio of switching semiconductor 12 is set as large as nearly 100% thereof in order to increase the electromotive force of the motor 11. Then, when arithmetic unit 15 determines that the regenerative braking is to be terminated, braking mode controller 15B of arithmetic unit 15 produces a make-contact signal for closing regeneration contactor 4. At the same time, a detection processing for detecting a contact voltage of the regeneration contactor 4 is started. This detection processing for detecting the contact voltage 21 of the regeneration contactor is repeated in a cycle substantially faster (shorter) than a switching signal cycle td during the regeneration braking.

Subsequently, when the contact of regeneration contactor 4 is closed, a contact voltage 21 of the regeneration contactor reaches the same level as the plus potential of dc power supply 1, which is detected by the braking mode controller 15B of arithmetic unit 15 to confirm that the regeneration contactor 4 is actually closed. Upon detection of the closure of the regeneration contactor 4, the drive permission signal 19 to drive gate 18 is set to low level thereby stopping switching signal 17 for the regeneration braking. Because this switching signal stop processing is done at the same timing and the same cycle as the processing of the detection of contact voltage 21 of the regeneration contactor, which is a faster cycle than the cycle td of the regeneration switching signal, therefore, actually, switching signal 17 for the regeneration braking is not stopped at a normal cycle of td of the normal switching signal 17 but is stopped at point A at which the closure of regeneration contactor 4 is detected. As described above, a stop point of time of switching signal 17 is always shorter than switching cycle td.

Namely, in the case where switching for the regeneration braking is continued at cycle td, and even when the closure of regeneration contactor 4 is detected at point A, it is only at point B in FIG. 2 that switching signal 17 is actually stopped. Therefore, there sustains a state during a time from the closure of regeneration contactor 4 to the stoppage of switching that the switching signal of the regeneration braking is still operating with the main circuit having been switched over to the plugging braking. Thereby, it is anticipated that a plugging current may rise as high as a level of IL2 in FIG. 2. However, if this level of IL2 becomes substantially large, it causes to produce a transient shock when shifting from the regeneration braking to the plugging braking, and if its level exceeds capacity of plugging diode 3, there may arise a problem of breakdown of the elements.

However, if the switching is stopped immediately after detection of the closure of regeneration contactor 4 by the arrangement and method of the invention as described in reference to FIG. 1, a stop position of switching signal 17 is shortened from point B to point A, thereby allowing for the switching signal 17 to be stopped at a faster timing than the normal timing after the closure of regeneration contactor 4, thereby suppressing a plugging current to the level of IL1, and minimizing the transient shock when shifting from the regeneration braking to the plugging braking, and further providing advantages to protect the contact of the regeneration contactor 4 from damages as well as to solve the problem of withstand voltage of plugging diode 3. At the same time, there is another advantage that a loss time in the transition from the regeneration braking to the plugging braking becomes zero, thereby providing an improved feeling and comfort during transition from the regeneration braking to the plugging braking.

Figure 3:
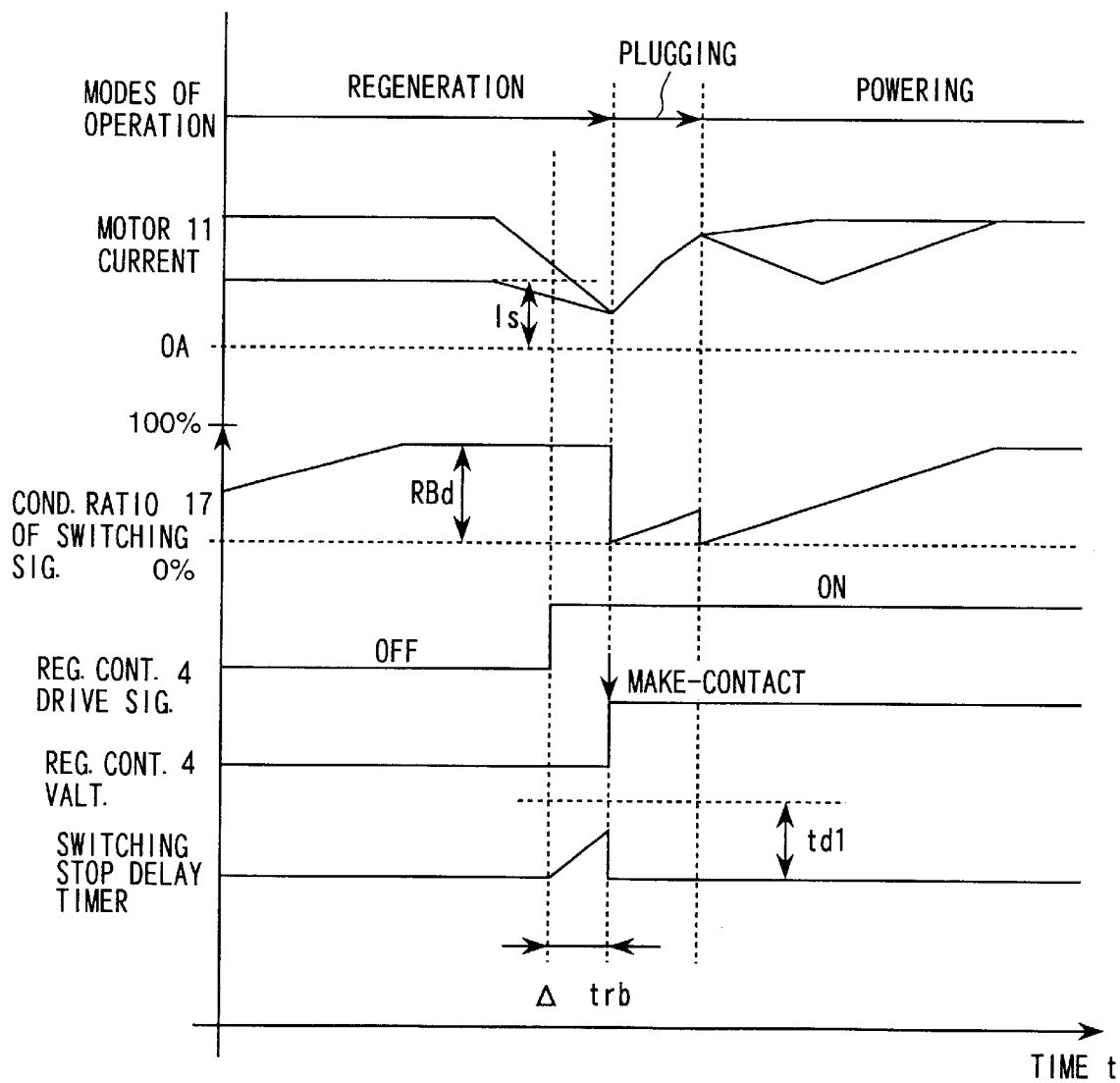
FIG. 3 is a time chart of operation of the control apparatus for electric vehicle of FIG. 1 in the step of transition from the regenerative braking to plugging braking.

FIG. 3 is a time chart of operation during transition from the regenerating braking to the plugging braking of the control apparatus for electric vehicle according to the embodiment of the invention shown in FIG. 1. Generally, during operation of the regenerating braking, because of a generation of a braking force, the rotation of motor 11 is gradually caused to drop. At this time, the braking mode controller 15B of arithmetic unit 15 causes the current conduction ratio of switching signal 17 to increase in accordance with a drop of the rotation of motor 11 in order for the braking force, i.e., the current flowing through the motor 11, to be maintained as constant as possible. Subsequently, when the conduction ratio rises to a level of RBd in the vicinity of 100% thereof, although arithmetic unit 15 continues the regenerating braking still after the rise of the conduction ratio to RBd level, the current of motor 11 is no more sustained to be constant and drops with a decrease of the electromotive force of motor 11, subsequently to a level of Is. The braking mode controller 15B of arithmetic unit 15 detects this switching conduction ratio RBd and this current Is to determine that the regenerating braking is to be terminated.

Immediately upon determination of stoppage of the regenerating braking, the arithmetic unit 15 produces a make-contact signal to close regenerative contactor 4, and its make-contact operation is executed. However, it should be noted that there exists a make-contact delay time Δtrb until the contact of regenerative contactor 4 is actually closed.

According to the feature of the invention, the regenerating braking is continued still during this delay time of Δtrb, that is, operation of switching semiconductor 12 for the regenerating braking is continued at the conduction level of RBd during this delay time. Simultaneously, the timer is counted on to measure its delay time until the closure thereof. After elapse of the make-contact delay time of Δtrb, and when the contact of the regenerative contactor 4 is actually closed, the arithmetic unit 15 stops generation of switching signal 17 for the regenerating braking, and causes to shift to the plugging braking according to the method as described in reference to FIG. 2. If a direction of rotation of motor 11 is reversed during the plugging braking, the mode of operation is caused to shift to a normal powering control.

Figure 4:
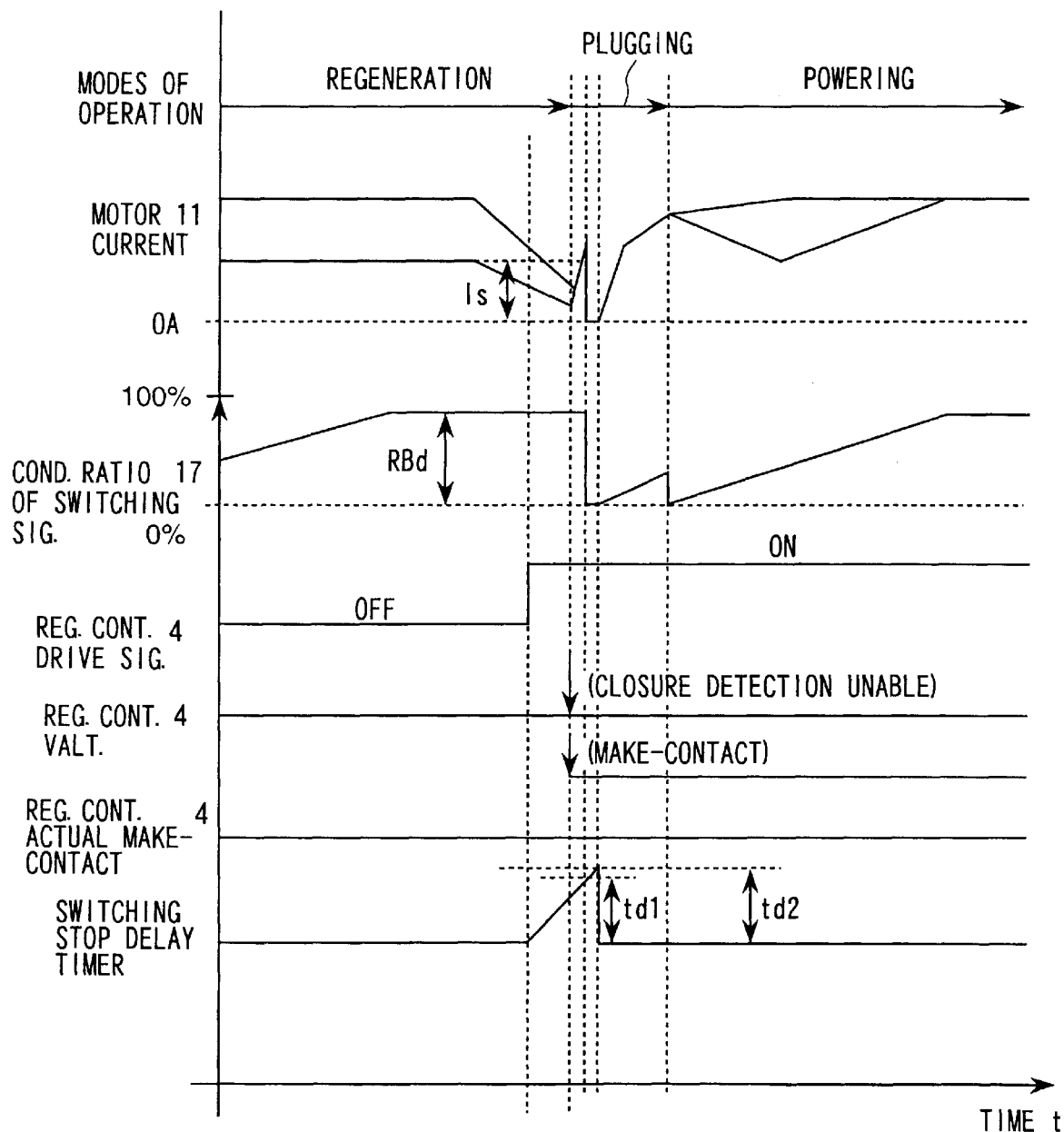
FIG. 4 is a time chart of operation of the control apparatus for electric vehicle of FIG. 1 in the step of transition from the regenerative braking to plugging braking in a case where detection of making-contact of the regenerative contactor is unable.

FIG. 4 is a time chart of operation during transition from the regenerating braking to the plugging braking of a control apparatus for electric vehicle according to another embodiment of the invention, contemplated for such a case where the detection of make-contact of the regenerative contactor is unable. As described above with reference to FIG. 3, when the conduction ratio of switching semiconductor 12 rises to the level of RBd, and the current of motor 11 drops below the level of Is while the regenerating braking is continued, and thereby the make-contact operation of the regenerative contactor 4 is started, counting of the switching stoppage delay timer starts simultaneously. As described above in the operation of the embodiment of the invention in reference to FIG. 3, the regenerating braking is continued until the actual closure of regenerative contactor 4, which is detected by continual sensing of contact voltage 21 of the regenerative contactor 4. However, there may occur such a case where the contact voltage 21 of the regenerative contactor 4 cannot be sensed due to failure of wiring or the like. In such a case, because of inability of sensing the closure of regenerative contactor 4, there arise a problem if no counter-measure is taken that the condition for allowing transition from the regenerating braking to the plugging braking cannot be established.

According to the invention, however, the counting of the switching stoppage delay timer is continued while continuing the regenerating braking. Subsequently, when a value of the switching stoppage delay timer reaches a level of td1, the braking mode controller 15B of arithmetic unit 15 determines that a detection of the closure of regenerative contactor 4 is unable due to unknown factors, and stops output of switching signal 17 by setting drive permission signal 19 to low level. This time level td1 is set longer than an actual make-contact time of regenerative contactor 4, and is a value which is variable corresponding to a power supply voltage of dc power source 1. Normally, in a period of time until time td1 elapses, the regenerative contactor should have been closed and a plugging current should be on the rise. However, according to the invention, because the switching is cut off when time td1 is reached, the current is caused to attenuate immediately. After that, the switching stoppage delay timer keeps counting on, and when the time reaches a level of td2, it is determined that the regenerating braking should be terminated and be shifted to the plugging braking, thereby executing transition to the plugging control.

Actually, because the regenerative contactor 4 is closed, immediately upon transition to the plugging control mode, a plugging current rises to cause a plugging braking state to occur so as to execute a plugging braking. By provision of such operation described above, it becomes possible for a safe transition from the regenerating braking to the plugging braking to be executed even in the case where the detection of the contact voltage 21 of regenerative contactor 4 is unable due to failure of wiring or the like, thereby ensuring the safe and comfortable operation of the electric vehicle to be maintained.

Figure 5:
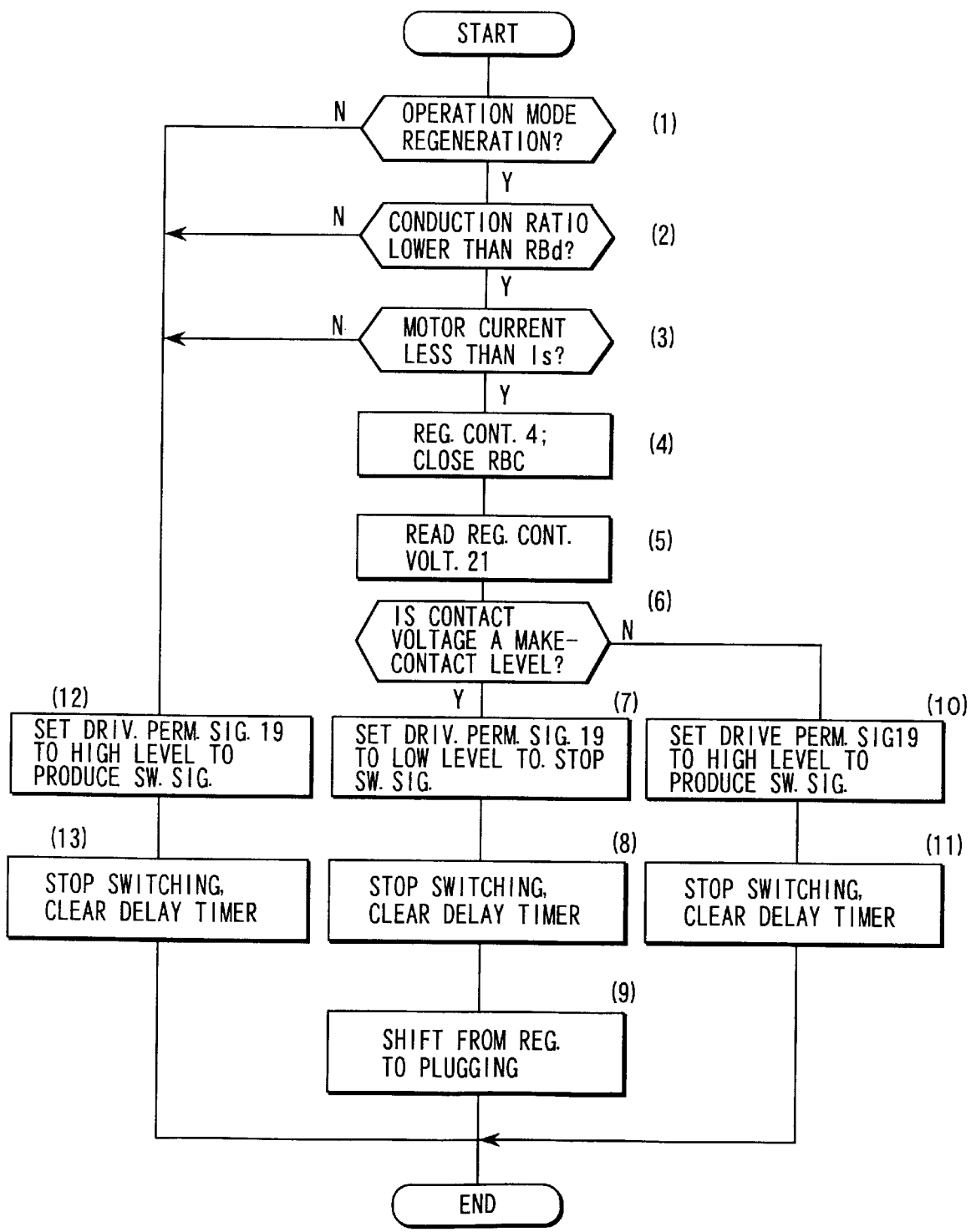
FIG. 5 is a flowchart indicating detection of closure of the regenerative contactor and its associated processing by a control mode controller and its arithmetic unit.

FIG. 5 is a flowchart indicating the steps of detection of closure of regenerative contactor 4 and its related processing executed by arithmetic unit 15, and in particular, by braking mode controller 15B thereof indicated in FIG. 1. In step (1), it is determined if or not the present operation is in a regenerating braking. If not, because detection of closure of regenerative contactor 4 is not necessary, the step advances to step (12), where drive permission signal 19 is set to high level, and the switching stoppage delay timer is cleared to end the processing. If it is determined in step (1) that the present operation is in the regenerating braking, the process moves to step (2), where a current conduction ratio of its switching signal is checked, and if its conduction ratio is below RBd, it is determined that it is still possible for the regenerating braking to be continued, then the process advances to step (12) so as to continue its regenerating braking. In case a switching conduction ratio is above RBd, because it indicates a condition where the braking mode controller 15B in arithmetic unit 15 senses a drop of the electromotive force of motor 11 and its conduction ratio is increased, the process moves to step (3) where the current of motor 11, namely, the level of its regeneration current is checked. If a motor current during the regeneration braking is above Is, the process advances to step (12) to continue its regeneration braking. If the motor current is below Is, the process moves to step (4). In step (4), because its regeneration braking is determined to be terminated on the basis of its switching conduction ratio and its motor current, the braking mode controller 15B of arithmetic unit 15 executes the make-contact operation of regenerative contactor 4.

Further, in step (5), read-out of a contact voltage 21 of the regenerative contactor 4 is executed. In step (6), a level of contact voltage 21 thereof is checked, and it is determined to make contact if its voltage level is above a threshold, and not to make contact if its voltage level is below the threshold. If determined not-to-make-contact, the output of the switching signal for the regeneration braking is continued by holding drive permission signal 19 at high level, and at the same time, a count of the switching stoppage delay timer is added assuming that the make-contact of regenerative contactor 4 is now in a queue in step (11), then the process ends. On the other hand, if regenerative contactor 4 is judged to have been closed in step (6), the process moves to step (7), where the drive permission signal 19 is set to low level to stop the output of the switching signal, namely, the operation of switching semiconductor 12 is caused to stop, then in step (8), the switching stoppage delay timer is cleared, and in step (9), a procedure for transition from the regenerating braking to the plugging braking is executed. By execution of the procedure for transition from the regenerating braking to the plugging braking, an operation mode itself moves from the regeneration mode to the plugging mode. Therefore, because a subsequent operation mode to execute in a subsequent step (1) is not a regenerating braking but is a plugging braking mode, the process advances directly to step (12), thereby omitting the make-contact detection processing of regenerative contactor 4.

Through execution of the steps of processing as described above, the control for the regenerating braking is ensured to be continued even in the delay time of regenerative contactor 4 during transition from the end of the regenerating braking to the plugging braking, and it is also ensured that immediately upon detection of closure of regenerative contactor 4, its switching signal is stopped at a timing without delay relative to the detection of the closure thereof so as to allow for a transition to the plugging braking. Therefore, a smooth transition from the regenerating braking to the plugging braking without impairing the drive feeling and comfort is enabled according to the invention.

Figure 6:
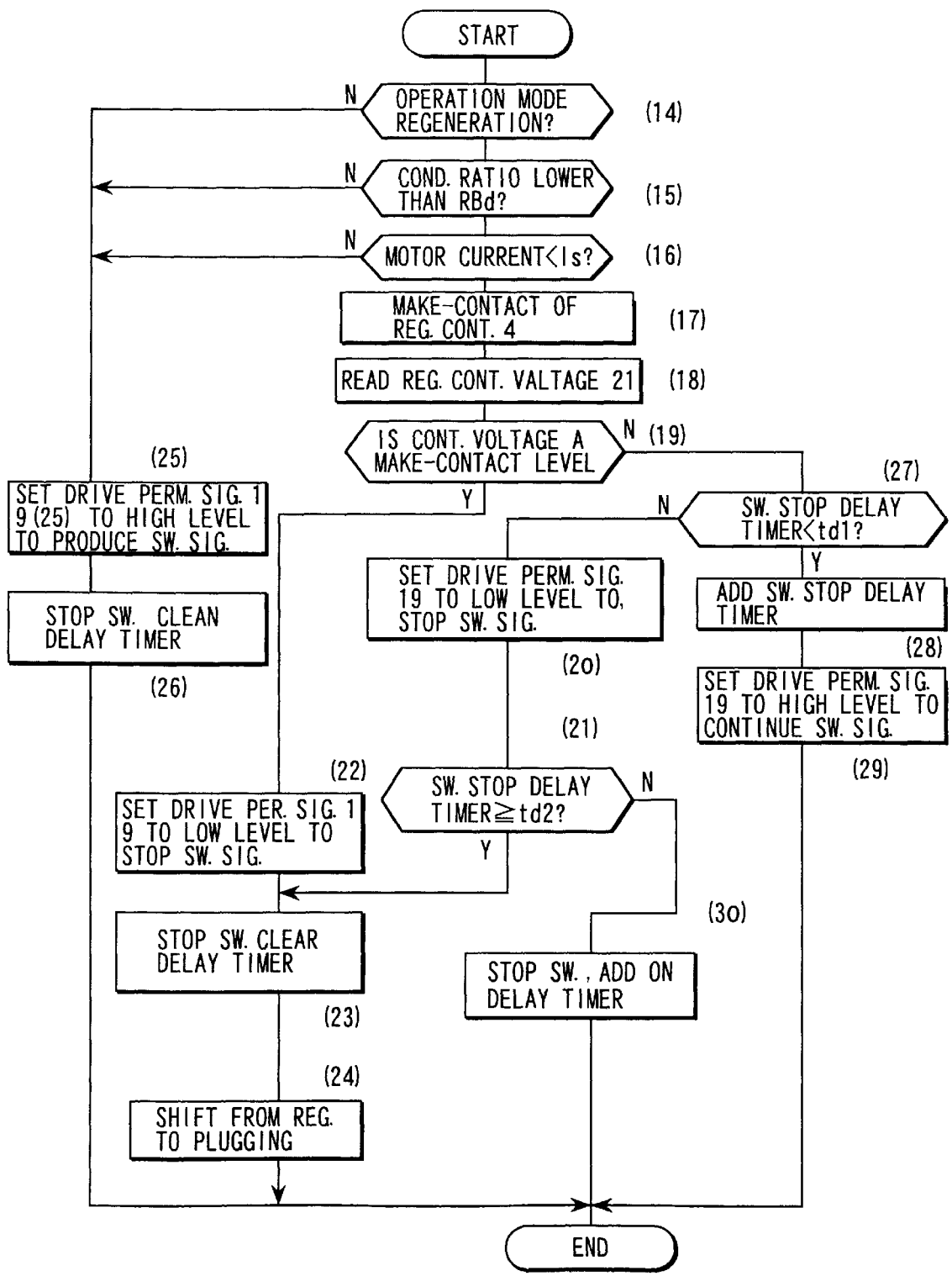
FIG. 6 is a flowchart indicating detection of closure of the regenerative contactor and its associated processing by the control mode controller and its arithmetic unit, in particular, when its detection of the closure thereof is unable.

FIG. 6 is another flowchart of operation and processing for detection of make-contact of regenerative contactor 4 and its related processing by arithmetic unit 15, and in particular, by braking mode controller 15B thereof indicated in FIG. 1, according to another embodiment of the invention, which is contemplated for such a case where the detection of the closure of regenerative contactor 4 is unable. At first, in step (14), its operation mode is discriminated, and if it is not a regenerating braking, the process advances to step (25) where drive permission signal 19 is set to high level to continue to output the switching signal, and in step (26) the switching stoppage delay timer is cleared, then the process ends. If its operation mode in step (14) is found to be the regenerating braking mode, a conduction ratio of switching is checked in step (15), and if its conduction ratio is not greater than RBd, it is judged that its regenerating braking can be continued still further, and the process advances to step (25). If its conduction ratio is greater than RBd, the process moves to step (16). In step (16), a current of motor 11 under the regenerating braking is checked, and if its current of motor 11 is greater than Is, it is judged that its regenerating braking can be continued still further, the process advances to step (25), and if smaller than Is, the process moves to step (17). The judgment in steps (15) to (16) refers to a determination whether to continue or stop its regenerating braking.

When the process moves to step (17), because a regeneration braking termination condition has been established, a make-contact control for closing regeneration contactor 4 is executed. Then, in step (18), a regeneration contactor's contact voltage 21 is read in order to detect the closure of regeneration contactor 4. In step (19), it is judged whether or not the make-contact is done on the basis of the voltage of regeneration contactor's contact voltage 21, and if judged that the regeneration contactor 4 has been closed, the process branches to step (22). In step (22), in order to immediately cut off the switching signal after closure of the regeneration contactor 4, its drive permission signal 19 is set to low level so as to stop its switching output. In step (23), the switching stoppage delay timer is cleared, and in step (24), a procedure for transition from the regenerating braking to the plugging braking is taken to end the process. According to this procedure for transition taken in step (24), in a subsequent judgment in step (14), because its operational mode is set in the plugging braking mode, its subsequent process needs not go through steps 15 and others to follow.

In case it is judged in step (19) that the regeneration contactor 4 is not closed, the process branches to step (27). In step (27), a value of the switching stoppage delay timer is compared with delay timer reference value td1. When the value of the switching stoppage delay timer is smaller than the delay time reference value td1, it is judged that it is still within a range of the make-contact delay queue time, thus, in step (28), the switching stoppage delay timer is counted on, and at the same time in step (29), drive permission signal 19 is maintained at high level to continue its switching output. In case in step (27) the value of the switching stoppage delay timer has reached the delay time reference value td1, it is judged that a condition has arisen in which the detection of the regeneration contactor's contact voltage 21 is unable although the make-contact delay queue time has elapsed, the process advances to step (20) in which drive permission signal 19 is set to low level to stop its switching output. In the next step (21), the value of the switching stoppage delay timer is further compared with a delay time reference value td2, and if the value thereof is smaller than the delay time reference value td2, in step (30), while continuing its switching stoppage, only the switching stoppage delay timer is counted on, then the process ends.

When the process ends after going through the aforementioned steps, because no procedure for transition of the operational modes has been taken, its operational mode of regenerating braking is maintained. If in step (21) a value of the switching stoppage delay timer is greater than the delay time reference value td2, because it proves that the detection of the closure of regeneration contactor 4 has been unable even after elapse of a sufficient time in excess of the make-contact delay time, it is judged that its regenerating braking should be terminated, and a process therefor is executed. Its process for termination advances to step (23), in which the switching stop delay timer is cleared, and in step (24), the operational mode transition from the regenerating braking to the plugging braking is executed and the process terminates.

As described above, when the detection of closure of regeneration contactor 4 is unable due to a failure of signal lines of regeneration contactor's contact voltage 21 or the like, it is arranged according to the steps of the invention such that after elapse of delay time reference value td1 from the start of the make-contact control for closing the regeneration contactor 4, the regeneration switching is stopped at first, then after elapse of delay time reference value td2, its regenerating braking operation is stopped to shift to the subsequent mode. Thereby, even if there occurs a failure of wiring or the like, without taking a complicated procedure, the operational mode can be shifted from the regenerating braking to the plugging braking easily, thereby ensuring for the operation of the control apparatus for electric vehicle to be continued.

According to the invention, an improved mode transition feeling during transition from the regenerating braking to the plugging braking can be obtained because its mode control transition therebetween can be executed by maintaining a stable and comfort condition without causing a loss time where no current conduction state persists and thus without causing a drop in the braking torque. Further, even if the detection of the regeneration contactor's contact voltage is unable due to failure of wiring or the like, the operation of the electric vehicle can be continued without impairing the performance of the control apparatus for the electric vehicle. Still further, by arranging such that the closure of the regeneration contactor is detected at the faster cycle than the switching cycle under the regenerating braking, and that the operation of the switching unit is stopped at the faster timing than the switching cycle, a rush current at the time of closure of the regeneration contactor is minimized, and the shock at the time of the transition as well as the contact damage of the regeneration contactor can be minimized.

What is claimed is:

1. A control apparatus for an electric vehicle comprising:
    a dc motor;
    a field switching unit for switching a direction of excitation of fields by switching connection of field winding of said dc motor;
    a dc power supply for supplying power to said dc motor;
    a switching unit for controlling said power supplied from said dc power supply and flowing a current to said dc motor;
    a regeneration contactor interconnected between said dc power supply and said dc motor;
    a control unit for controlling operation of said switching unit and said regeneration contactor such that said dc motor is operated in either modes of powering, regenerating braking or plugging braking, wherein
    when shifting operation of said dc motor from its regenerating braking to plugging braking, detection of closure of said regeneration contactor is determined on the basis of a contact voltage of said regeneration contactor which is sensed between said regeneration contactor and an armature of said dc motor, and upon detection of the closure thereof, operation of said switching unit is stopped to allow for a transition to said plugging braking.

2. A control apparatus for an electric vehicle according to claim 1, wherein a detection of said regeneration contactor's contact voltage is executed in a period of time which extends starting from a point at which a current conduction ratio of switching in a switching element during the regenerating braking become greater than its threshold value which defines a condition for stopping the regenerating braking and a current of said motor during the regenerating braking becomes smaller than its threshold value, to a point at which the closure of the regenerating contactor is detected.

3. A control apparatus for an electric vehicle according to claim 1, wherein the detection of said regeneration contactor's contact voltage is executed at a timing faster than the switching cycle of said switching element during the regenerating braking, and upon detection of the closure of said regeneration contactor, by operation of the drive permission signal from the arithmetic unit, operation of the switching unit is stopped at a timing faster than the switching cycle of the switching element under the regenerating braking.

4. A control apparatus for an electric vehicle according to claim 1, wherein a make-contact delay time until said regeneration contactor is actually closed is pre-stored in memory relative to a voltage of said dc power supply as a parameter, a period of time from a start of a make-contact control for closing said regeneration contactor to its actual closure is measured and compared with the make-contact delay time based on the voltage of said dc power supply, and if said regeneration contactor's contact voltage is not detected within said make-contact delay time, the control mode thereof is shifted from the regenerating braking to the plugging braking upon elapse of the make-contact delay time.

5. A control apparatus for an electric vehicle according to claim 4, wherein for an operation mode switching on the basis of measurement of a make-contact delay time of said regeneration contactor, there are provided a first threshold value which is a first make-contact delay time of said regeneration contactor corresponding to a voltage of said dc power supply, and a second threshold value which is a second make-contact delay time thereof which is obtained by adding a predetermined queue time to said first make-contact delay time, and wherein when said regeneration contactor's contact voltage is not detected, the operation of said switching element for its regenerating braking is stopped upon elapse of time of said first threshold value, then upon elapse of time of said second threshold value, transition from its regenerating braking to plugging braking is executed.

6. A control apparatus for an electric vehicle comprising:
   a dc motor;
   a field switching unit for switching a direction of excitation of fields by switching connection of field winding of said dc motor;
   a dc power supply for supplying power to said dc motor;
   a switching unit for controlling said power supplied from said dc power supply and flowing a current to said dc motor;
   a regeneration contactor interconnected between a plus terminal of said dc power supply and an armature of said dc motor; and
   a control unit for controlling operation of said switching unit and said regeneration contactor such that said dc motor is operated in either modes of powering, regenerating braking or plugging braking, said control unit including an arithmetic unit which produces a drive signal for said switching unit and a drive permission signal therefor, a logical product being taken from said drive signal and said drive permission signal to output a drive signal for driving said switching unit; wherein,
   a regeneration contactor's contact voltage sensed between said regeneration contactor and said armature is entered to the arithmetic unit, and a detection of closure of said regeneration contactor is determined on the basis of said regeneration contactor's contact voltage, and wherein during transition of operation of said dc motor from a regenerating braking to a plugging braking, a make-contact processing for closing said regeneration contactor is executed while continuing its regenerating braking even during a delay time until the actual closure of the regeneration contactor, and immediately upon detection of the closure of the regeneration contactor, the operation of the switching unit is stopped at a timing faster than the switching cycle of the regenerating braking so as to allow for transition to the plugging braking.

7. A control method of a control apparatus for an electric vehicle comprising: a dc motor; a field switching unit for switching a direction of excitation of fields by switching connection of a field winding of said dc motor; a dc power supply for supplying power to said dc motor; a switching unit for controlling the power supplied from said dc power supply and flowing a current to said dc motor; a regeneration contactor interconnected between said dc power supply and an armature of said dc motor; and a control unit for controlling operation of said switching unit and said regeneration contactor such that said d.c motor is operated in either modes of powering, regenerating braking or plugging braking, wherein the method thereof comprises the steps of:
   detecting a closure of said regeneration contactor during transition of said dc motor from its regenerating braking to plugging braking on the basis of a regeneration contactor's contact voltage which is sensed between said regeneration contactor and said armature; stopping operation of said switching unit upon detection of the closure thereof; and allowing for transition to the plugging braking.

* * * * *